(12) United States Patent
Money

(10) Patent No.: US 10,920,680 B2
(45) Date of Patent: Feb. 16, 2021

(54) SYSTEM AND METHOD FOR PROVIDING ENGINE BRAKING

(71) Applicant: Ford Global Technologies, LLC, Dearborn, MI (US)

(72) Inventor: Eric Van Anrooy Money, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 15/882,663

(22) Filed: Jan. 29, 2018

(65) Prior Publication Data
US 2019/0234317 A1  Aug. 1, 2019

(51) Int. Cl.
| F02D 13/04 | (2006.01) |
| F02D 41/00 | (2006.01) |
| F02D 41/12 | (2006.01) |
| F02D 13/02 | (2006.01) |
| F02D 23/00 | (2006.01) |

(52) U.S. Cl.
CPC ......... *F02D 13/04* (2013.01); *F02D 13/0215* (2013.01); *F02D 23/00* (2013.01); *F02D 41/0005* (2013.01); *F02D 41/123* (2013.01); *F02D 41/0007* (2013.01); *F02D 2041/001* (2013.01)

(58) Field of Classification Search
CPC .... F02D 13/04; F02D 41/0005; F02D 41/123; F02D 13/0215; F02D 23/00; F02D 41/0007; F02D 2041/001; F01L 13/06; F01L 13/065

See application file for complete search history.

(56) References Cited

U.S. PATENT DOCUMENTS

| 5,117,790 A | 6/1992 | Clarke et al. |
| 5,537,976 A * | 7/1996 | Hu .......................... F01L 9/021 |
| | | 123/322 |
| 6,269,793 B1 * | 8/2001 | Russ ................... F02D 13/0219 |
| | | 123/325 |
| 6,273,039 B1 | 8/2001 | Church |
| 6,321,704 B1 | 11/2001 | Church et al. |
| 6,951,198 B1 | 10/2005 | Megli et al. |
| 7,458,345 B2 | 12/2008 | Winstead et al. |
| 7,930,087 B2 | 4/2011 | Gibson et al. |
| 8,966,897 B2 * | 3/2015 | Hahn .................. F02B 29/0481 |
| | | 60/611 |
| 2006/0005807 A1 * | 1/2006 | Megli ..................... F02D 13/06 |
| | | 123/322 |
| 2006/0032479 A1 * | 2/2006 | Megli ....................... F01L 9/04 |
| | | 123/322 |
| 2014/0303873 A1 | 10/2014 | Glugla et al. |

* cited by examiner

*Primary Examiner* — Audrey K Bradley
*Assistant Examiner* — Edward Bushard
(74) *Attorney, Agent, or Firm* — Geoffrey Brumbaugh; McCoy Russell LLP

(57) ABSTRACT

Systems and methods for reducing noise and vibration that may be associated with engine braking are presented. In one example, intake and exhaust valve timings are adjusted to reduce engine noise and vibration at lower engine braking request levels. The engine intake and exhaust valve timings increase compression engine braking and decrease engine expansion braking for higher engine braking request levels.

13 Claims, 7 Drawing Sheets

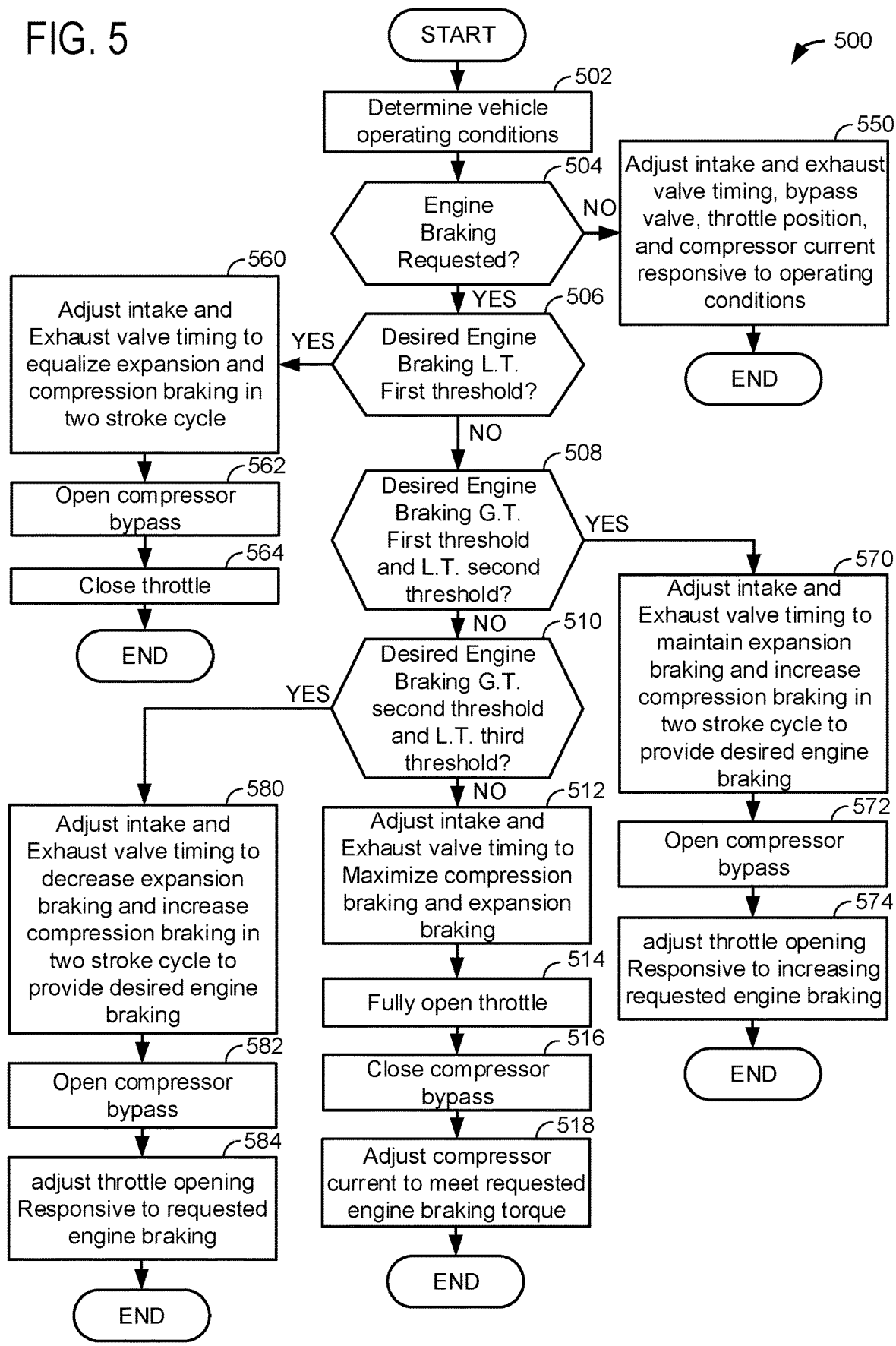

SYSTEM AND METHOD FOR PROVIDING ENGINE BRAKING

FIELD

The present description relates to a system and methods for providing engine braking to control vehicle speed during low driver demand torque conditions. The system and methods may be particularly useful for engines that include variable valve timing.

BACKGROUND AND SUMMARY

A vehicle may travel on roads that have both positive and negative grades. If the vehicle is traveling on a road having a negative grade, the vehicle's speed may be maintained or the vehicle may accelerate even when driver demand torque is zero. It may be desirable to limit the vehicle's speed or to decelerate the vehicle when the vehicle is traveling on a road having a negative grated, but applying the vehicle's brakes may increase brake ware and brake heating. The vehicle's speed may also be slowed when driver demand is low via applying engine braking. The engine may provide a negative or braking torque to vehicle wheels through the vehicle's transmission by ceasing to supply the engine with fuel. However, the engine's braking torque may increase driveline or powertrain noise, vibration, and harshness during some conditions when vehicle occupants may expect to hear and feel a very quiet powertrain. Therefore, it may be desirable to provide a way of reducing engine noise, vibration, and harshness when an engine is providing braking torque to slow a vehicle.

The inventor herein has recognized the above-mentioned issues and have developed an engine control method, comprising: adjusting intake and exhaust poppet valve timing via a controller to equalize engine braking torque generated via compression braking and engine braking torque generated via expansion braking in response to a requested braking torque that is less than a first threshold torque.

By adjusting intake and exhaust valve timing to equalize engine braking torque generated via compression braking and expansion braking, it may be possible to provide the technical result of reducing engine noise, vibration, and harshness during some engine braking conditions. In particular, engine vibration may be reduced during low engine braking conditions by providing nearly equal compression and braking torque during strokes of an engine cycle. The nearly equal compression and braking torques generated during a particular stroke during an engine cycle may provide more uniform torque pulsations at the engine crankshaft, thereby reducing engine noise and vibration. Further, the present approach may be extended to generate greater engine braking torques than may be provided via other engine braking approaches.

The present description may provide several advantages. In particular, the approach may reduce engine noise and vibration when an engine is operating in a braking mode. Further, the approach may be extended to increase engine braking torque so that a vehicle may be slowed even on long steep grades. In addition, the approach may reduce electrical consumption for systems that include an electric compressor that supplies air to an engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 5 shows a flow chart of an example method for operating an engine.

DETAILED DESCRIPTION

Figure 6A:
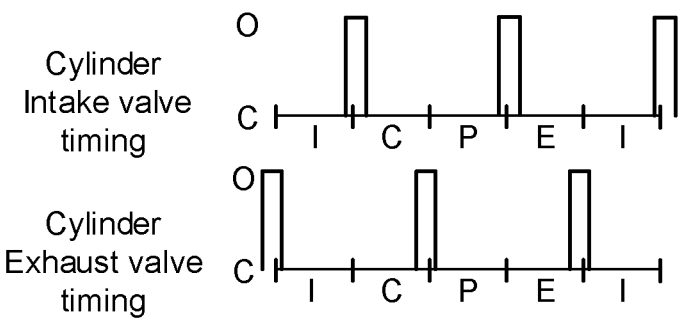
FIGS. 6A-6C show expanded views of the intake and exhaust valve timings described in FIGS. 4 and 5.
Figure 6B:
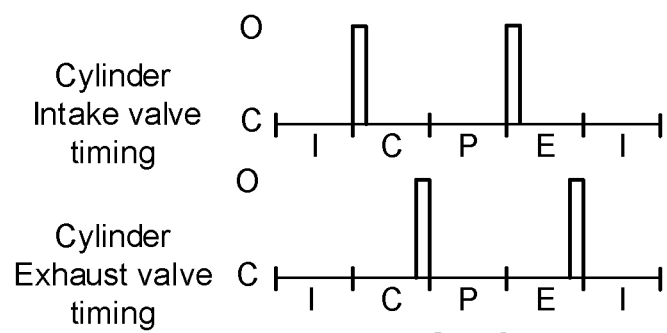

The present description is related to operating an engine in an engine braking mode. The engine may be operated in the braking mode in a way that reduces engine noise and vibration. Further, the engine may be operated in a way that provides for higher levels of engine braking torque. The engine may be of the type shown in FIGS. 1-2B. The engine may generate braking torque via providing compression torque and expansion torque as is shown in FIGS. 3A and 3B. The engine may be operated via a controller according to the sequence shown in FIG. 4. A method for operating the engine of FIGS. 1-2B to provide low engine noise and vibration at low engine braking levels and to provide high levels of braking torques is shown in FIG. 5. Expanded views of example intake and exhaust valve timings are shown in FIGS. 6A and 6B.

Figure 1:
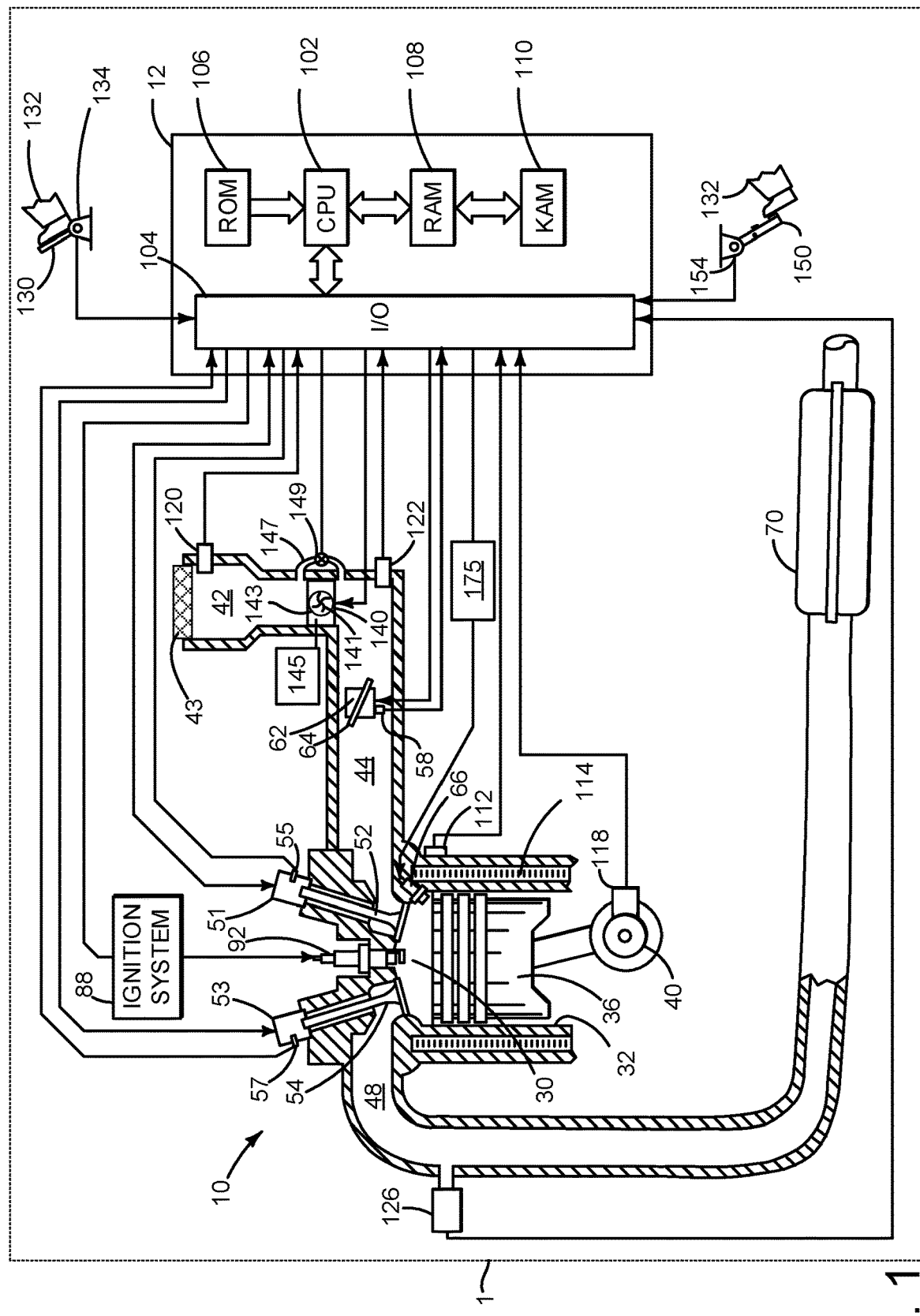
FIG. 1 is a schematic diagram of an engine.

Referring to FIG. 1, internal combustion engine 10 is included in vehicle 1 and it comprises a plurality of cylinders, one cylinder of which is shown in FIG. 1. Engine 10 is controlled by electronic engine controller 12. The controller receives signals from the various sensors of FIG. 1 and it employs the various actuators of FIG. 1 to adjust engine operation based on the received signals and instructions stored in memory of controller 12.

Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake poppet valve 52 and exhaust poppet valve 54. Each intake and exhaust valve may be operated by a variable intake valve operator 51 and a variable exhaust valve operator 53, which may be actuated mechanically, electrically, hydraulically, or by a combination of the same. For example, the valve actuators may be of the type described in U.S. Patent Publication 2014/0303873 and U.S. Pat. Nos. 6,321,704; 6,273,039; and 7,458,345, which are hereby fully incorporated for all intents and purposes. Intake valve operator 51 and an exhaust valve operator may open intake 52 and exhaust 54 valves synchronously or asynchronously with crankshaft 40. The position of intake valve 52 may be determined by intake valve position sensor 55. The position of exhaust valve 54 may be determined by exhaust valve position sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Optional electric compressor 140 may provide compressed or pressurized air upstream of throttle 62 to increase engine performance and improve engine braking. Electric compressor 140 may pump air from air intake 42 to throttle 62 via increasing a speed of vanes 141 via electric machine (e.g., motor) 143. Controller 12 may increase and decrease a speed of vanes 141 to increase and decrease air pressure upstream and downstream of throttle 62. Controller 12 may increase compressor speed via increasing electric current supplied to electric compressor 140. Controller 12 may decrease compressor speed via decreasing electric current supplied to electric compressor 140. Electric compressor may receive electrical power from electric energy storage device (e.g., battery) 145. Electric compressor bypass valve 149 may be opened to allow air to flow around electric compressor 140 via bypass passage 147. Alternatively, electric compressor bypass valve 149 may be closed to prevent air from flowing around electric compressor 140.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2A:
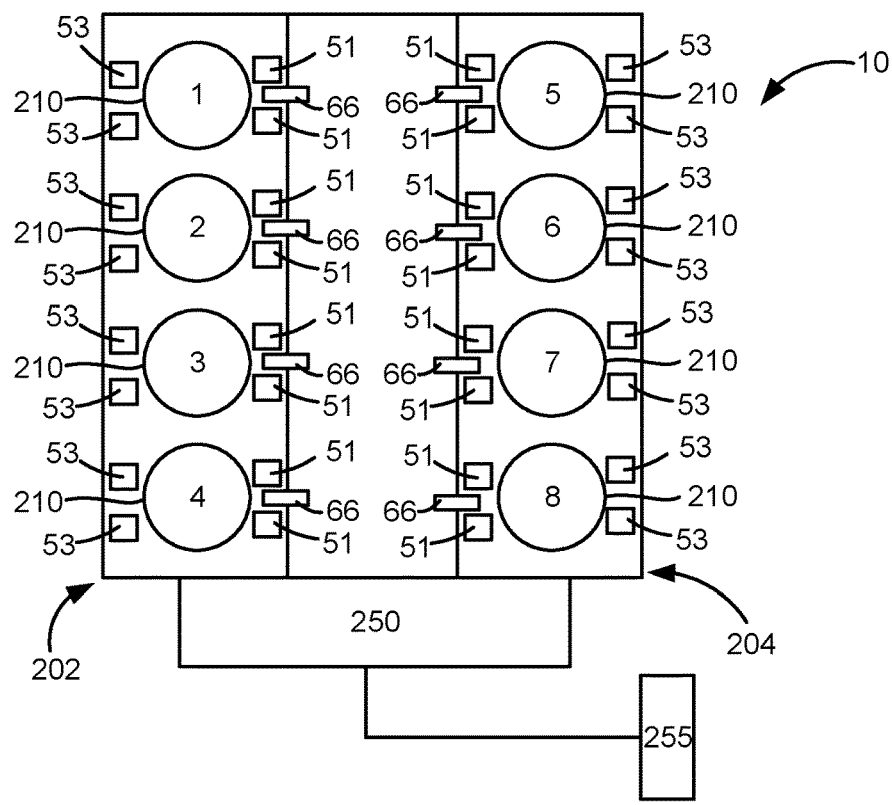
FIG. 2A is a schematic diagram of an eight cylinder engine with two cylinder banks.
Figure 3A:
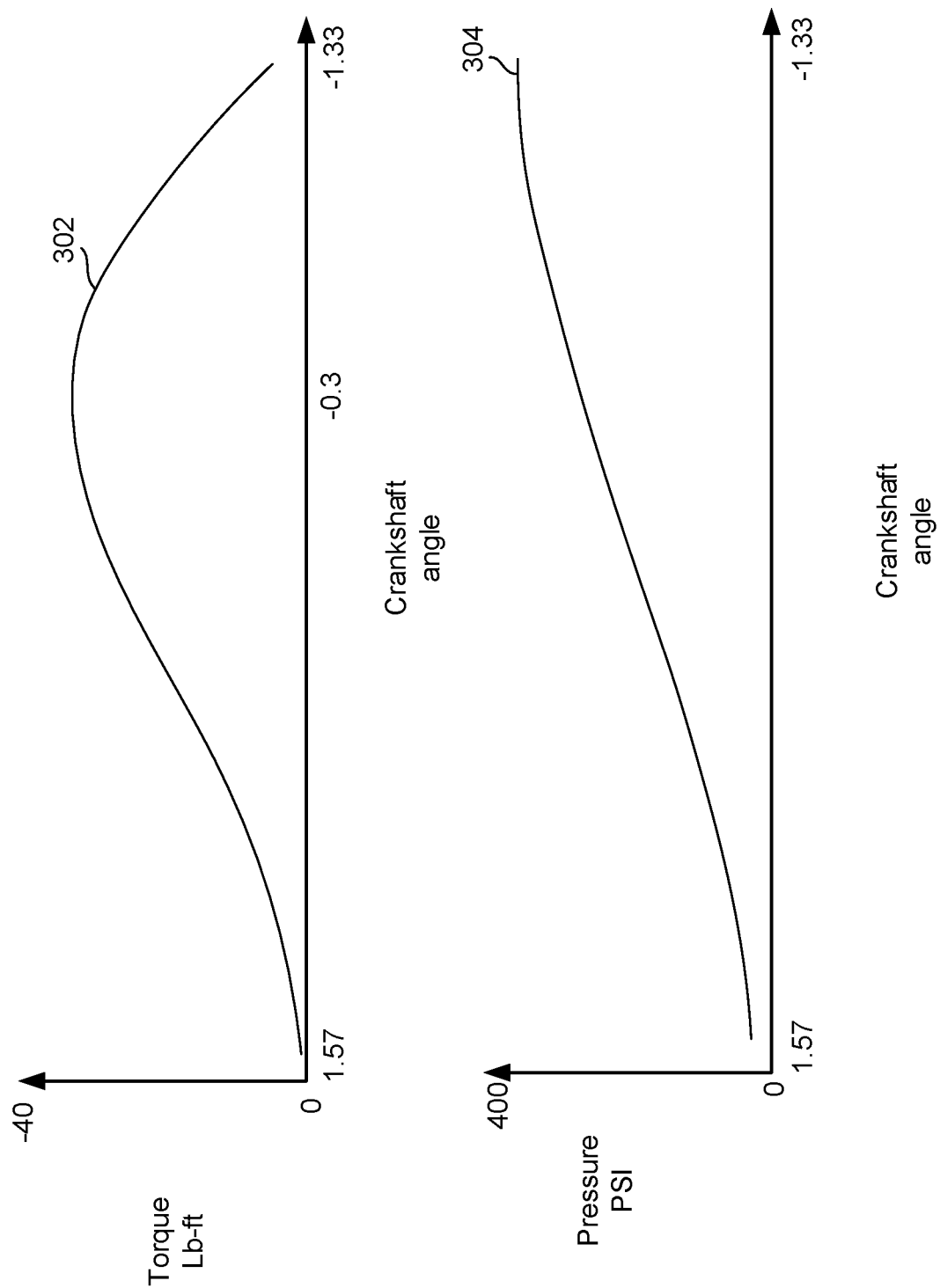
FIG. 3A is a plot of engine compression braking characteristics.
Figure 3B:
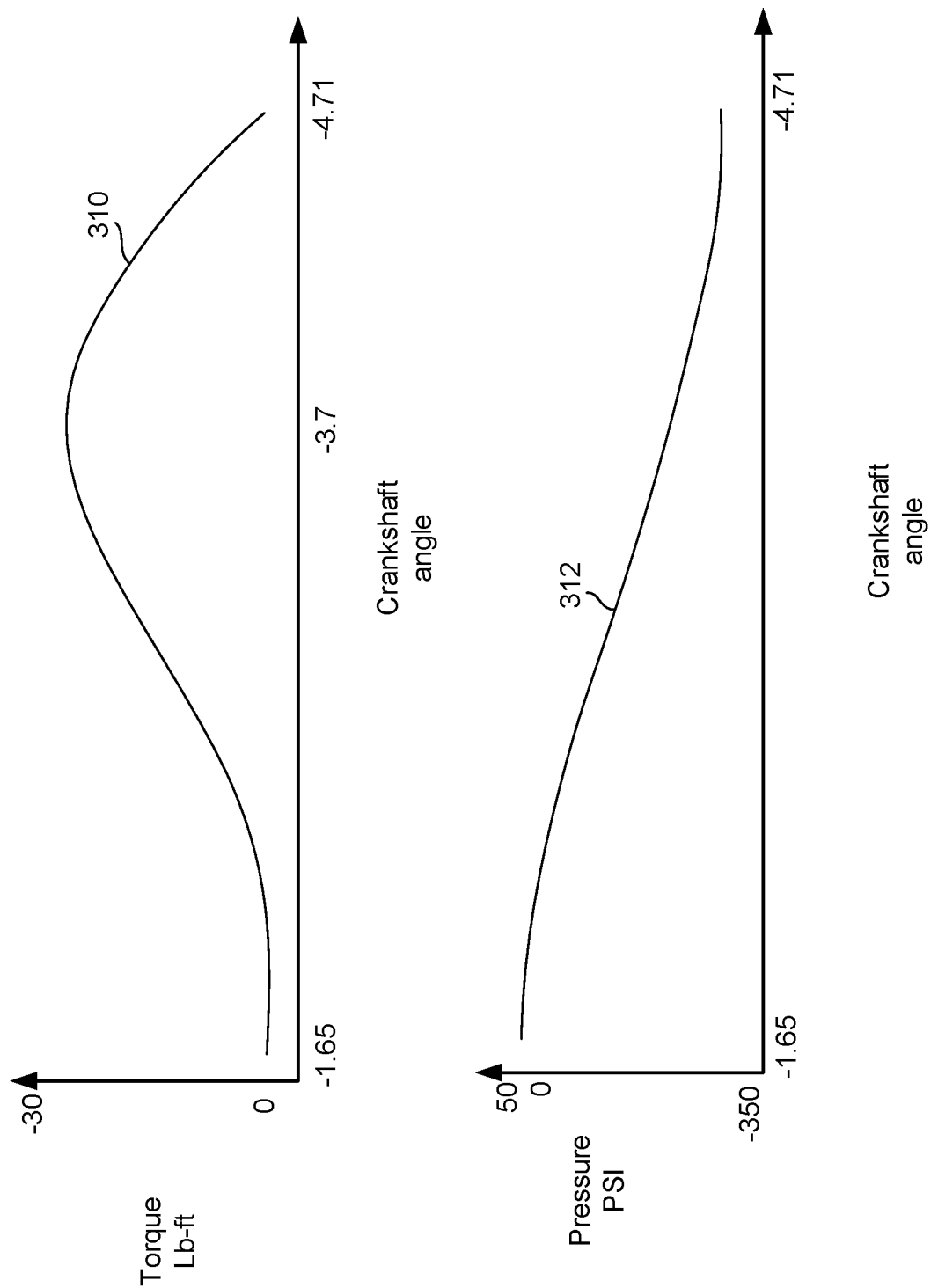
FIG. 3B is a plot of engine expansion braking characteristics.

Referring now to FIG. 2A, an example multi-cylinder engine that includes two cylinder banks is shown. The engine includes cylinders and associated components as shown in FIG. 1. Engine 10 includes eight cylinders 210. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively operated to generate compression braking and expansion braking. Compression braking may be generated by the engine when air is trapped within a cylinder and compressed via closing intake and exhaust valves. The work of compressing air in the cylinder provides a negative torque to the engine's crankshaft when the crankshaft is rotated, which may be used to slow a vehicle when the crankshaft 40 is coupled to transmission 250 and wheel 255. Expansion braking may also be provided by the engine when the intake and exhaust valves are closed and the volume of the cylinder is expanded by the cylinder's piston moving toward bottom dead center position. The work of expanding the cylinder and generating vacuum in the cylinder provides a negative torque to the engine's crankshaft when the crankshaft is rotated, which may be used to slow a vehicle when the crankshaft 40 is coupled to transmission 250 and wheel 255.

Engine 10 includes a first cylinder bank 202, which includes four cylinders 1-4, and a second cylinder bank 304, which includes cylinders 5-8. Cylinders of each cylinder bank may be active or deactivated during a cycle of the engine. Each cylinder includes variable intake valve operators 51 and variable exhaust valve operators 53. The intake and exhaust valves may be opened and held open or closed and held closed based on engine crankshaft position. For example, intake and exhaust valves may be opened at particular crankshaft angles and closed at particular crankshaft angles in response to crankshaft position. The intake and exhaust valves may trap air or exhaust within a cylinder, release air or exhaust from the cylinder, and allow air to flow into a cylinder.

Figure 2B:
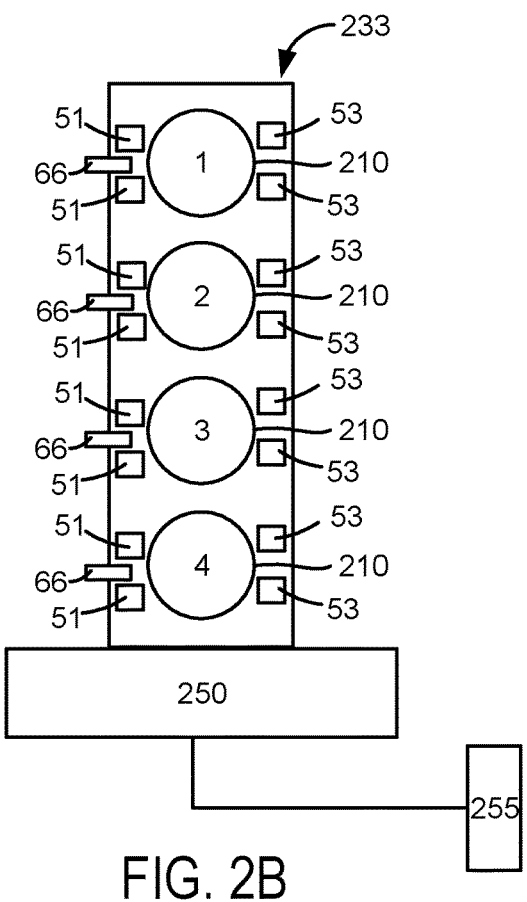
FIG. 2B is a schematic diagram of a four cylinder engine with a single cylinder bank.

Referring now to FIG. 2B, an example multi-cylinder engine that includes one cylinder bank is shown. The engine includes cylinders and associated components as shown in FIG. 1. Engine 10 includes four cylinders 210. Each of the four cylinders is numbered and the numbers of the cylinders are included within the cylinders. Fuel injectors 66 selectively supply fuel to each of the cylinders that are activated (e.g., combusting fuel during a cycle of the engine with intake and exhaust valves opening and closing during a cycle of the cylinder that is active). Cylinders 1-4 may be selectively operated to generate compression braking and expansion braking. Compression braking may be generated by the engine when air is trapped within a cylinder and compressed via closing intake and exhaust valves. The work of compressing air in the cylinder provides a negative torque to the engine's crankshaft when the crankshaft is rotated, which may be used to slow the vehicle when the crankshaft 40 is coupled to transmission 250 and wheel 255. Expansion braking may also be provided by the engine when the intake and exhaust valves are closed and the volume of the cylinder is expanded by the cylinder's piston moving toward bottom dead center position. The work of expanding the cylinder and generating vacuum in the cylinder provides a negative torque to the engine's crankshaft when the crankshaft is rotated, which may be used to slow a vehicle when the crankshaft 40 is coupled to transmission 250 and wheel 255.

Engine 10 includes a single cylinder bank 233, which includes four cylinders 1-4. Cylinders of the single bank may be active or deactivated during a cycle of the engine. Each cylinder includes variable intake valve operators 51 and variable exhaust valve operators 53. The intake and exhaust valves may be opened and held open or closed and held closed based on engine crankshaft position. For example, intake and exhaust valves may be opened at particular crankshaft angles and closed at particular crankshaft angles in response to crankshaft position. The intake and exhaust valves may trap air or exhaust within a cylinder, release air or exhaust from the cylinder, and allow air to flow into a cylinder.

The system of FIGS. 1-2B provides for an engine system, comprising: an engine including adjustable intake and exhaust poppet valve mechanisms; an electric compressor coupled to the engine; and a controller including executable instructions stored in non-transitory memory to adjust intake and exhaust valve timing in response to a requested engine braking torque that is less than a threshold torque while not increasing current supplied to an electric compressor. The engine system further comprises additional instructions to increase current supplied to the electric compressor in response to the requested engine braking torque exceeding the threshold torque after the intake and exhaust valve timing has been adjusted to increase engine compression torque and decrease engine expansion torque. The engine system further comprises additional instructions to adjust intake and exhaust poppet valve timing via the controller to equalize engine braking torque generated via compression braking and engine braking torque generated via expansion braking in response to the requested braking torque being less than the threshold torque. The engine system further comprises additional instructions to increasing engine compression braking and decreasing engine expansion braking. The engine system further comprises a compressor bypass valve. The engine system further comprises additional instructions to open the compressor bypass valve in response to the requested engine braking torque being less than the threshold torque.

Referring now to FIG. 3A, two prophetic plots showing engine compression torque are shown. The first plot from the top of FIG. 3A is a plot of engine compression torque generated via a single piston and cylinder of an engine versus engine crankshaft angle. The vertical axis represents engine compression torque (e.g., torque at the engine crankshaft that is due to compressing air in the cylinder when the crankshaft is rotated) in units of pound-feet (Lb-ft). The engine compression torque increases in the direction of the vertical axis arrow. The negative sign of the torque value indicates that the plot is showing that torque is applied to the crankshaft to rotate the engine. Torque generated by the crankshaft to rotate the transmission and propel the vehicle is indicated by a positive sign (not shown in this example because the sequence is illustrating engine braking torque), and the numerical value along the vertical axis indicates the magnitude of the torque to rotate the engine. The horizontal axis represents engine crankshaft angle in radians. Curve 302 represents engine compression torque. In this example, intake and exhaust valves for the cylinder are held closed during a compression stoke of the cylinder while air is trapped in the cylinder beginning at BDC compression stroke.

The second plot from the top of FIG. 3A is a plot of pressure in the cylinder versus engine crankshaft angle. The vertical axis represents cylinder pressure (e.g., pressure in the cylinder that is due to compressing air in the cylinder when the crankshaft is rotated) in units of pounds per square inch (PSI). The cylinder pressure increases in the direction of the vertical axis arrow. The horizontal axis represents engine crankshaft angle in radians. Curve 304 represents engine compression torque.

At an engine crankshaft angle of 1.57 radians, the compression torque is low so that the crankshaft may be rotated with very little torque. The pressure in the cylinder at the engine crankshaft angle of 1.57 radians is also low. As the engine is rotated from the left side of the plot to the right side of the plot, the engine crankshaft angle is changed from 1.57 radians to −1.33 radians. However, before the crankshaft angle reaches −1.33 radians, the engine generates a peak engine compression torque at about −0.3 crankshaft radians. The peak or maximum engine compression torque has a magnitude of about 34 Lb-ft. The cylinder pressure has not reached its peak value at the −0.3 crankshaft radians location and it continues to increase. The difference in the peak engine compression torque at −0.3 crankshaft radians and the peak cylinder pressure at −1.33 crankshaft radians may be attributable to crankshaft offset.

Thus, it may be observed that engine compression torque increases as the engine is rotated from BDC compression stroke (1.57 crankshaft radians) to provide a maximum engine compression torque having a magnitude of 34 Lb-ft (a value that may vary from engine to engine) at −0.3 radians, and then, the engine compression torque is reduced as the piston approaches TDC compression stroke at −1.33 radians. As such, the engine compression torque may be applied as a torque that resists vehicle motion and wheel rotation (e.g., a negative torque) when the engine is coupled to vehicle wheels via a transmission as is shown in FIGS. 2A and 2B.

Referring now to FIG. 3B, two prophetic plots showing engine expansion torque are shown. The first plot from the top of FIG. 3B is a plot of engine expansion torque generated via a single piston and cylinder of an engine versus engine crankshaft angle. The vertical axis represents engine expansion torque (e.g., torque at the engine crankshaft that is due to expanding air in the cylinder when the crankshaft is rotated) in units of pound-feet (Lb-ft). The engine expansion torque increases in the direction of the vertical axis arrow. The negative sign of the torque value indicates that the plot is showing that torque is applied to the crankshaft to rotate the engine. Torque generated by the crankshaft to rotate the transmission and propel the vehicle is indicated by a positive sign (not shown in this example because the sequence is illustrating engine braking torque), and the numerical value along the vertical axis indicates the magnitude of the torque to rotate the engine. The horizontal axis represents engine crankshaft angle in radians. Curve 310 represents engine expansion torque. In this example, intake and exhaust valves for the cylinder are held closed beginning at TDC during an intake stoke of the cylinder with only the cylinder's clearance volume of air being trapped in the cylinder.

The second plot from the top of FIG. 3B is a plot of pressure in the cylinder versus engine crankshaft angle. The vertical axis represents cylinder pressure (e.g., pressure in the cylinder that is due to expanding air in the cylinder when the crankshaft is rotated) in units of pounds per square inch (PSI). The negative pressure values indicate vacuum in the cylinder relative to atmospheric pressure. The cylinder pressure increases in the direction of the vertical axis arrow. The horizontal axis represents engine crankshaft angle in radians. Curve 310 represents engine expansion torque.

At an engine crankshaft angle of −1.65 radians, the expansion torque is low so that the crankshaft may be rotated with very little torque. The pressure in the cylinder at the engine crankshaft angle of −1.65 radians is also low. As the engine is rotated from the left side of the plot to the right side of the plot, the engine crankshaft angle is changed from −1.65 radians to −4.71 radians. However, before the crankshaft angle reaches −4.71 radians, the engine generates a peak engine expansion torque at about −3.7 crankshaft radians. The peak or maximum engine expansion torque has a magnitude of about 26 Lb-ft. The cylinder pressure has not reached its lowest value at the −3.7 crankshaft radians location and it continues to decrease. The difference in the peak engine expansion torque at −3.7 crankshaft radians and the lowest cylinder pressure at −4.71 crankshaft radians may be attributable to crankshaft offset.

Thus, it may be observed that engine expansion torque increases as the engine is rotated from TDC intake stroke (−1.65 crankshaft radians) to provide a maximum engine expansion torque having a magnitude of 26 Lb-ft (a value that may vary from engine to engine) at −3.7 radians, and then, the engine expansion torque is reduced as the piston approaches BDC intake stroke at −4.71 radians. As such, the engine expansion torque may be applied as a torque that resists vehicle motion and wheel rotation (e.g., a negative torque) when the engine is coupled to vehicle wheels via a transmission as is shown in FIGS. 2A and 2B.

Figure 4:
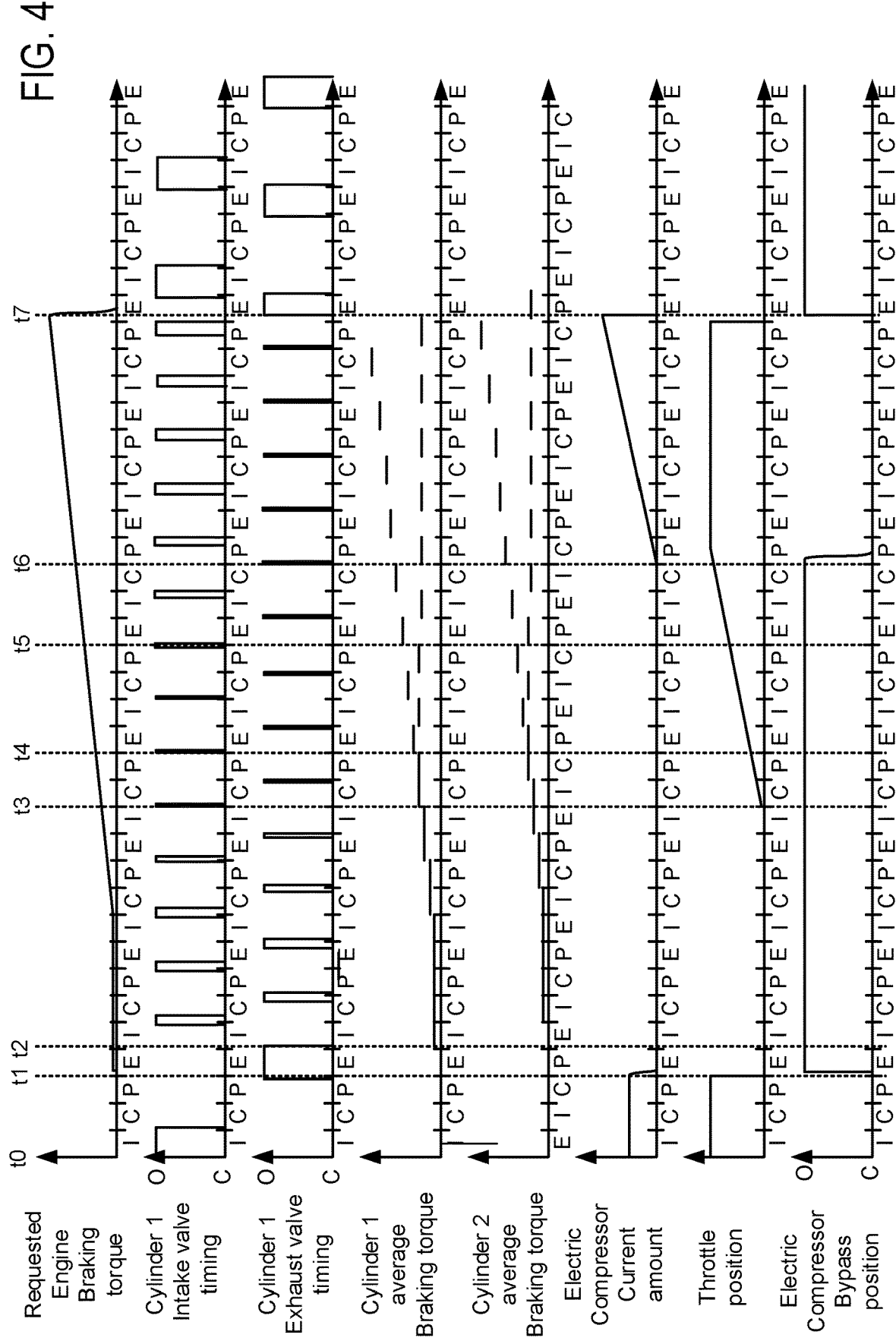
FIG. 4 shows plots of example engine operating sequence according to the method of FIG. 5.

Referring now to FIG. 4, plots of a prophetic engine operating sequence are shown. The engine operating sequence of FIG. 4 is in accordance with the method of FIG. 5. The eight plots are aligned in time and occur at the same time. The vertical lines labeled t0-t7 represent times of particular interest during the engine operating sequence. The engine operating sequence may be provided by the system of FIGS. 1-2B according to the method of FIG. 5. The sequence of FIG. 4 is based on a four cylinder four stroke engine having a firing order of 1-3-4-2. Only the cylinder poppet valve timing of cylinder number one is shown to reduce complexity, but valve timing of the engine's other cylinders is similar. In this example, an engine cycle duration is 720 crankshaft degrees during which each cylinder under goes four strokes whether the engine is operating with two or four stroke valve timing for purposes of clarity. Likewise, a cylinder cycle is four strokes and 720 crankshaft degrees whether the engine is operating with two or four stroke valve timing. Further, cylinder strokes are identified based on four stroke cylinder operation irrespective of intake and exhaust valve operation.

The first plot from the top of FIG. 4 is a plot of requested engine braking torque (e.g., a negative torque that resists rotation of the engine via the vehicle's kinetic energy being transmitted to the engine via wheels and a transmission) versus the strokes of engine cylinder number one. The vertical axis represents the magnitude of the requested engine brake torque and the magnitude of the requested engine brake torque increases in the direction of the vertical axis. A negative sign is not provided for magnitude values since the torque is indicated as an engine braking torque. The horizontal axis represents the strokes of cylinder number one and the strokes are indicated by the following abbreviations: I—intake stroke; C—compression stroke; P—power stroke or expansion stroke; and E—exhaust stroke. The vertical bars between the strokes indicate either TDC or BDC positions. Vertical bars between compression and power strokes indicate TDC. Vertical bars between power and exhaust strokes indicate BDC. Vertical bars between exhaust stroke and intake strokes indicate TDC. Vertical bars between intake and compression strokes indicate BDC. Although, the intake and exhaust valves may be opened and closed synchronous or asynchronous with crankshaft rotation, the strokes of a four cycle engine are illustrated to provide a familiar reference beginning from a time when the engine operates combusting air and fuel in a four stroke mode to a time where the engine provides engine braking.

The second plot from the top of FIG. 4 is a plot of cylinder number one intake valve timing versus the strokes of engine cylinder number one. The vertical axis represents the position of intake poppet valves of cylinder number one. The "O" indicates an intake valve position where the intake poppet valves of cylinder number one are fully open. The "C" indicates an intake valve position where the intake poppet valves of cylinder number one are fully closed. The horizontal axis represents the strokes of cylinder number one and the strokes are indicated as previously discussed in the description of the first plot from the top of FIG. 4. The intake valves are closed when the trace is not visible.

The third plot from the top of FIG. 4 is a plot of cylinder number one exhaust valve timing versus the strokes of engine cylinder number one. The vertical axis represents the position of exhaust poppet valves of cylinder number one. The "O" indicates an exhaust valve position where the exhaust poppet valves of cylinder number one are fully open. The "C" indicates an exhaust valve position where the exhaust poppet valves of cylinder number one are fully closed. The horizontal axis represents the strokes of cylinder number one and the strokes are indicated as previously discussed in the description of the first plot from the top of FIG. 4. The exhaust valves are closed when the trace is not visible.

The fourth plot from the top of FIG. 4 is a plot of the average engine braking torque provided by cylinder number one versus the strokes of engine cylinder number one. The vertical axis represents the magnitude of the average engine braking torque provided by cylinder number one and the magnitude of the average engine braking torque increases in the direction of the vertical axis arrow. The average engine braking torque provided by cylinder number one is indicated for each cylinder stroke of cylinder number one. The horizontal axis represents the strokes of cylinder number one and the strokes are indicated as previously discussed in the description of the first plot from the top of FIG. 4. It should be noted that cylinder number four may provide similar engine braking torque values as those shown for cylinder number one since the position of the piston in cylinder number four relative to the engine block is the same as the piston position of cylinder number one.

The fifth plot from the top of FIG. 4 is a plot of the average engine braking torque provided by cylinder number two versus the strokes of engine cylinder number two. The vertical axis represents the magnitude of the average engine braking torque provided by cylinder number two and the magnitude of the average engine braking torque increases in the direction of the vertical axis arrow. The average engine braking torque provided by cylinder number two is indicated for each cylinder stroke of cylinder number two. The horizontal axis represents the strokes of cylinder number two and the strokes are indicated as previously discussed in the description of the first plot from the top of FIG. 4, except the strokes of cylinder number two are offset by 180 crankshaft degrees. It should be noted that cylinder number three may provide similar engine braking torque values as those shown for cylinder number two since the position of the piston in cylinder number three relative to the engine block is the same as the piston position of cylinder number two.

The sixth plot from the top of FIG. 4 is a plot of an amount of electric current supplied to an electric compressor in the engine intake versus the strokes of engine cylinder number one. The vertical axis represents the amount of electric current supplied to the electric compressor and the amount of electric current increases in the direction of the vertical axis. The horizontal axis represents the strokes of cylinder number one and the strokes are indicated as previously discussed in the description of the first plot from the top of FIG. 4.

The seventh plot from the top of FIG. 4 is a plot of engine throttle position versus the strokes of engine cylinder number one. The vertical axis represents the engine throttle position and the throttle opening amount increases in the direction of the vertical axis. The horizontal axis represents the strokes of cylinder number one and the strokes are indicated as previously discussed in the description of the first plot from the top of FIG. 4.

The eighth plot from the top of FIG. 4 is a plot of a position of an electric compressor bypass valve versus the strokes of engine cylinder number one. The vertical axis represents the position of electric compressor bypass valve. The "O" indicates an electric compressor bypass valve position where the electric compressor bypass valve is fully open. The "C" indicates an electric compressor bypass valve position where the electric compressor bypass valve is fully closed. The horizontal axis represents the strokes of cylinder number one and the strokes are indicated as previously discussed in the description of the first plot from the top of FIG. 4.

At time t0, engine braking is not requested and the intake valve of cylinder number one is open. The exhaust valves are closed and the average braking torques for cylinders number one and two is zero. The amount of current supplied to the electric compressor is a middle level indicating that the electric compressor is pressurizing air entering the engine. The engine throttle is partially open and the electric compressor bypass valve is closed. By closing the electric compressor bypass valve while the electric compressor is supplying pressurized air to the engine, electric compressor efficiency may be improved.

At time t1, cylinder number one is starting an exhaust stroke and the engine throttle is closed in response to driver (e.g., human or autonomous) input to an accelerator pedal or other controller input (not shown). A small amount of air may pass through the throttle even though the throttle is closed due to a throttle stop that holds the throttle plate open a small amount. The exhaust valve of cylinder number one is open so exhaust gases are discharged from cylinder number one. The requested engine braking torque is zero and the intake valve of cylinder number one is closed. The average engine braking torque provided via cylinder number one and cylinder number two is zero. The electric current supplied to the electric compressor begins to decrease in response to the throttle closing. The compressor bypass valve is closed. Fuel delivery and spark delivery to engine cylinders ceases (not shown) and the engine continues to rotate via engine inertia and the vehicle's kinetic energy that is supplied from the vehicles wheels to the engine. The engine is coupled to the wheels (not shown) throughout the sequence of FIG. 4 and the engine rotates via torque provided by the vehicle's wheels throughout the sequence after time t1 and up to time t7.

Between time t1 and time t2, the engine rotates through the exhaust stroke of cylinder number one and the requested engine braking torque increases to a small amount. The electric compressor bypass valve is opened to allow air to bypass the electric compressor and electric current flow to the electric compressor is very low. The average engine braking torque generated by cylinder number one is zero because the exhaust valve of cylinder number one is open and exhaust gases are being expelled from cylinder number one. Similarly, cylinder number two is in the process of completing a combustion cycle that began before time t1, so average engine braking torque generated by cylinder number two is zero. Current flow to the electric compressor is so low that vanes of the electric compressor do not turn, or turn at a speed that is less than a threshold speed. The engine throttle remains closed and the intake valve of cylinder number one remains closed.

At time t2, shortly after TDC intake stroke, the exhaust valve closes and the generation of engine braking torque begins as indicated by the average engine braking torque generated by cylinder number one increasing. The intake valve of cylinder number one is closed so that only a small volume of air near ambient pressure is trapped in cylinder number one. The average engine braking torque generated by cylinder number two is still zero since cylinder number two is completing its last combustion cycle. Current flow to the electric compressor is so low that vanes of the electric compressor do not turn or turn at a speed that is less than a threshold speed. The engine throttle is closed and the compressor bypass valve is open.

Between time t2 and time t3, the requested engine braking torque for the first five strokes of cylinder number one after time t2 is a low value and constant. The intake and exhaust valve timing is adjusted to equalize expansion engine braking and compression engine braking. The intake valves are opened and closed two times for every engine cycle. Thus, two stroke compression and expansion braking is provided via the engine's cylinders. Compression braking torque is generated during compression and exhaust strokes of the engine's cylinders. Expansion torque is generated during intake and power strokes of the engine's cylinders. The intake valves are opened a first time during an engine cycle (e.g., from a first intake stroke of cylinder number one to a second intake stroke of cylinder number one) four strokes of the cylinder during a last quarter of an intake stroke of cylinder number one and the intake valves are closed a first time during the engine cycle during a first quarter of a compression stroke of cylinder number one that immediately follows the intake stroke. The intake valves are opened a second time in the engine cycle during a last quarter of a power stroke of cylinder number one and the intake valves are closed during a first quarter of an exhaust stroke of cylinder number one that immediately follows the power stroke.

Likewise, the exhaust valves are opened and closed two times for each engine cycle. The exhaust valves are opened a first time during the engine cycle during a last quarter of a compression stroke of cylinder number one and the exhaust valves are closed a first time during the engine cycle during a first quarter of a power stroke of cylinder number one that immediately follows the compression stroke. The exhaust valves are opened a second time in the engine cycle during a last quarter of an exhaust stroke of cylinder number one and the exhaust valves are closed a second time during the engine cycle during a first quarter of an intake stroke of cylinder number one that immediately follows the exhaust stroke.

The intake and exhaust valves may be open longer during the compression strokes and the exhaust strokes of cylinder number one than during the intake strokes and the power strokes of cylinder number one because higher engine braking torque may be provided via compression braking than expansion braking as is shown in FIGS. 3A and 3B. Leaving the intake and exhaust valves open longer during the compression and exhaust strokes of cylinder number one may equalize the average engine braking torque generated by cylinder number one when cylinder number one is engaged in generating expansion braking and compression braking by limiting the amount of air that is trapped in the cylinder during compression braking. Because less engine braking torque may be provided in intake and power strokes, the intake valves and exhaust valves of cylinder number one may be held closed longer during these strokes as compared to the duration that intake and exhaust valves are held closed during compression and exhaust strokes of cylinder number one. In this way, equal engine compression and braking torques may be provided via a cylinder during a cycle of the engine.

At the sixth stroke of cylinder number one after time t2, cylinder number one is rotating through a compression stroke and the requested braking torque is increased. In one example, the requested engine braking torque may increase responsive to a brake pedal position. Alternatively, or in addition, the requested engine braking torque may be increased responsive to vehicle speed increasing when driver demand torque is low (e.g., while the accelerator pedal is fully released). The average engine braking torque generated by cylinder number one and cylinder number two is increased via adjusting intake and exhaust valve timing. It should be noted that average engine braking torque generated by cylinder number three and four is increased similarly in response to the requested engine braking torque increasing.

The average engine braking torque generated by cylinder number one may be increased via shortening the opening duration of the intake and exhaust valves during the compression strokes and the exhaust strokes of cylinder number one. Further, the opening duration of the intake and exhaust valves during the intake and power strokes of cylinder number one may be decreased to increase the average engine braking torque generated by cylinder number one and equalize cylinder number one expansion torque and compression torque. The intake valve and exhaust valve timings are adjusted responsive to the increasing requested engine braking torque.

At time t3, the engine throttle opening amount begins to increase in response to the increasing engine brake torque request. Further, intake valve opening time may be delayed to TDC or later during the compression stroke of cylinder number one during the engine cycle beginning at the intake stroke of cylinder number one immediately before time t3, and it may also be delayed to TDC or later during the exhaust stroke of the same engine cycle so that cylinder number one expansion torque may be maximized for the present intake and exhaust manifold pressures. The exhaust valve closing times may also be advanced to TDC compression stoke and TDC exhaust stroke of cylinder number one during an engine cycle so that cylinder number one expansion torque may be maximized for the present intake and exhaust manifold pressures.

At time t4, the requested engine braking torque has been increased to a threshold level where the requested engine braking torque may not be provided by the engine without allowing compression braking torque of engine cylinders to increase to greater values than expansion braking torque for the engine cylinders. Therefore, the throttle is opened further to increase the amount of air trapped in the cylinders during compression and exhaust strokes. Further, the opening time of the intake and exhaust valves of cylinder number one and the other cylinders may be reduced to increase the amount of air trapped in the cylinders and the duration that the air is trapped in the cylinder so long as reducing the opening time allows the compression torque to increase. The increase in compression braking torque generated by opening the throttle and adjusting intake and exhaust valve timing is indicated by the higher levels of average engine braking torque produced during the exhaust and compression strokes between time t4 and time t5 for cylinder number one. Likewise, the increase in compression braking torque generated by opening the throttle and adjusting intake and exhaust valve timing is indicated by the higher levels of average engine braking torque produced during the exhaust and compression strokes between time t4 and time t5 for cylinder number two. The electric compressor bypass valve remains in an open position so that air may enter the engine without passing through the electric compressor. This allows the electric compressor to be supplied little or no current during lower requested engine brake torque levels, thereby conserving electrical power. The electric compressor vanes do not rotate at this time. The expansion torque for cylinder number one and cylinder number two that is indicated by the average engine braking torque generated in intake and power strokes remains at its prior level.

At time t5, the requested braking torque has reached a level where the average engine braking torque may not be increased further without decreasing expansion torque generated by cylinder numbers one and two. Therefore, the first intake valve opening time of cylinder number one during a cycle of cylinder number one is advanced into the intake stroke of cylinder number one and the second intake valve opening time of cylinder number one during the cycle of cylinder number one is advanced into the power stroke of cylinder number one. Further, the first exhaust valve opening time of cylinder number one during the cycle of cylinder number one may be retarded into the power stroke of cylinder number one to increase the amount of air trapped in cylinder number one during the compression stroke of cylinder number one. The second exhaust valve opening time of cylinder number one during the cycle of cylinder number one may be retarded into the intake stroke of cylinder number one to increase the amount of air trapped in cylinder number one during the exhaust stroke of cylinder number one.

The engine throttle opening amount continues to increase between time t5 and time t6 in response to the increasing requested engine torque. Further, the average engine braking torque produce via compression and exhaust strokes of cylinders one and two is shown increasing while the average braking torque produced via intake and power strokes of cylinders one and two decreases a small amount. The electric compressor remains drawing only a small amount of electrical current, if any, such that the compressor vanes do not rotate. The electric compressor bypass valve remains open to allow air to bypass the electric compressor.

At time t6, the requested engine braking torque has increased to a level where opening the throttle more provides little additional engine braking torque. Therefore, the electric compressor current is increased as a function of the requested engine braking torque so that the compressor vanes begin to rotate and generate compressed air for the engine. By compressing the air, larger amounts of air may be trapped in engine cylinders during compression and exhaust strokes so that the average engine compression braking torque may be increased. The intake and exhaust valves continue to open and close in two stroke fashion so that both compression braking and expansion braking are provided via cylinder number one and the other engine cylinders. The separation in torque levels between average cylinder number one braking torque increases since the compression braking torque of cylinder number one increases due to activating the electric compressor and because activating the electric compressor has little effect on expansion braking torque generated by cylinder number one. The compressor bypass valve is closed shortly after time t6 to increase the efficiency of the electric compressor. The throttle is fully open shortly after time t6. The average engine braking torque increases as the requested engine braking torque increases.

At time t7, the requested engine braking torque is reduced. The requested engine braking torque may be reduced via a human driver releasing a brake pedal (not shown) or via an autonomous controller requesting less engine braking torque. The engine is reactivated and starts combusting in response to the reduction in the requested engine braking torque. The intake valve opening times and closing times along with the exhaust valve opening and closing times are adjusted so that the engine resumes combustion in a four stroke mode. The average engine braking torque provided via cylinder number one and cylinder number two is reduced to zero and the electric compressor current is reduced to a low value so that compressor vanes do not rotate. The engine throttle is closed and the electric compressor bypass is opened to allow air to bypass the electric compressor.

In this way, intake and exhaust valve timing may be adjusted to increase engine braking torque. Further, intake and exhaust valve timing may be adjusted to improve equalization of compression torque and expansion torque generated by a cylinder during a cycle of the cylinder. Further still, current supplied to an electric compressor may be adjusted as a function of requested engine braking torque after opening of a throttle is insufficient to increase engine braking torque to meet the requested engine braking torque. As a result, electrical power may be conserved until the requested engine braking torque is greater than a threshold engine braking torque. Additionally, intake and exhaust valve timing may be adjusted in cooperation with adjusting the throttle so that very low levels of engine braking may be generated. This may allow the vehicle to extend its coasting range while still providing engine braking to slow the vehicle.

Referring now to FIG. 5, a method for operating an engine is shown. The method of FIG. 5 may be incorporated into and may cooperate with the system of FIGS. 1-2B. Further, at least portions of the method of FIG. 5 may be incorporated as executable instructions stored in non-transitory controller memory while other portions of the method may be performed via a controller transforming operating states of devices and actuators in the physical world.

For clarity purposes, the description of method 500 follows a convention where an engine cycle duration is 720 crankshaft degrees during which each cylinder under goes four strokes whether the engine is operating with two or four stroke valve timing. Likewise, a cylinder cycle is four strokes and 720 crankshaft degrees whether the engine is operating with two or four stroke valve timing. Further, cylinder strokes are identified based on four stroke cylinder operation (e.g., intake, compression, power or expansion, and exhaust) irrespective of intake and exhaust valve operation.

At 502, method 500 determines vehicle operating conditions. Vehicle operating conditions may include but are not limited to requested braking torque as determined via brake pedal position, vehicle speed, engine speed, engine load, battery state of charge, accelerator pedal position, driver demand torque, throttle position, electric compressor current, electric compression bypass valve position, intake valve timing, and exhaust valve timing. Method 500 proceeds to 504.

At 504, method 500 judges if engine braking torque is requested. Engine braking torque may be requested via a controller in response to vehicle speed, state of battery charge, and brake pedal position. The controller may output a requested amount of engine braking torque responsive vehicle operating conditions. If method 500 judges that engine braking torque is requested (e.g., a requested amount of engine braking torque is non-zero), the answer is yes and method 500 proceeds to 506. Otherwise, the answer is no and method 500 proceeds to 550.

If method 500 judges that engine braking is requested, combustion within engine cylinders may be ceased while the engine continues to rotate while being supplied with the vehicle's kinetic energy the engine via the vehicle's wheels and transmission. Thus, the transmission may be engaged in a gear while engine braking is requested. Combustion in engine cylinders may be ceased via stopping fuel flow and spark to engine cylinders.

At 550, method 500 intake and exhaust valve timing are adjusted to support four-stroke combustion by the engine. For example, the intake valves of a cylinder may be open for a substantial portion of the intake stroke of the cylinder and closed for the remainder of the cylinders cycle. Likewise, the cylinders exhaust valves may be open for a substantial portion of the cylinder's exhaust stroke and closed for the remainder of the cylinder's cycle (e.g., a four stroke cycle). Further, spark and fuel are supplied to engine cylinders so that combustion resumes in engine cylinders. The intake and exhaust valve timing as well as the throttle position may also be adjusted responsive to engine speed and driver demand torque. The driver demand torque may be a function of accelerator pedal position and vehicle speed. Likewise, current supplied to the electric compressor may be a function of engine speed and driver demand torque. Method 500 proceeds to exit.

At 506, method 500 judges if the requested amount of engine braking torque is less than (L.T.) a first threshold engine braking torque. In one example, the first threshold engine braking torque may be an engine braking torque where the requested engine braking torque is greater than an amount of engine braking that may be provided by equal amounts of expansion braking torque and compression braking torque. The first threshold engine braking torque may be empirically determined via operating the engine on a dynamometer and measuring expansion and compression braking torques while intake and exhaust valve timing is adjusted. If method 500 judges that the requested amount of engine braking torque is less than a first threshold engine braking torque, then the answer is yes and method 500 proceeds to 560. Otherwise, the answer is no and method 500 proceeds to 508.

At 560, method 500 adjusts intake and exhaust valve timing of engine cylinders to equalize compression braking with expansion braking provided via the engine's cylinders and provide the requested engine braking torque. In one example, intake and exhaust valves may be operated in a two stroke fashion with timings as is shown in FIG. 4 between times t2 and t3. Examples of such times are also shown in FIG. 6A. In particular, the intake valves are opened and closed two times for every engine cycle. Thus, two stroke compression and expansion engine braking is provided via the engine's cylinders. Compression braking torque is generated during compression and exhaust strokes of the engine's cylinders. Expansion braking torque is generated during intake and power strokes of the engine's cylinders. The intake valves are opened a first time during an engine cycle during a last quarter (e.g., 45 crankshaft degrees) of an intake stroke during the cycle of the engine and the intake valves are closed a first time during the engine cycle during a first quarter of a compression stroke of the cylinder that immediately follows the intake stroke during the engine cycle. The intake valves are opened a second time in the engine cycle during a last quarter of a power stroke of the cylinder and the intake valves are closed a second time during the engine cycle during a first quarter of an exhaust stroke that immediately follows the power stroke during the engine cycle.

Similarly, the exhaust valves are opened and closed two times for every engine cycle. The exhaust valves are opened a first time during the engine cycle during a last quarter of a compression stroke of the cylinder and the exhaust valves are closed a first time during a first quarter of a power stroke of the cylinder that immediately follows the compression stroke during the engine cycle. The exhaust valves of the cylinder are opened a second time during the engine cycle during a last quarter of an exhaust stroke of the cylinder, and the exhaust valves are closed the second time during the engine cycle during a first quarter of an intake stroke of the cylinder that immediately follows the exhaust stroke of the cylinder.

The intake and exhaust valves may be open longer during the compression strokes and the exhaust strokes of the cylinder than during the intake strokes and the power strokes of the cylinder because higher engine braking torque may be provided via compression braking than expansion braking as is shown in FIGS. 3A and 3B. Holding the intake and exhaust valves open longer during the compression and exhaust strokes of the cylinder may equalize the average engine braking torque generated by the cylinder when the cylinder number one is engaged in generating expansion braking and compression braking by limiting the amount of air that is trapped in the cylinder during compression braking. Because less engine braking torque may be provided in intake and power strokes (e.g., expansion braking), the intake valves and exhaust valves of the cylinder be held closed longer during these strokes as compared to the duration that intake and exhaust valves are held closed during compression and exhaust strokes of the cylinder. The intake and exhaust opening and closing timings may be empirically determined and stored in controller memory in a table or function. The table or function may be referenced via engine speed and the requested engine braking amount. Method 500 proceeds to 562.

At 562, method 500 opens the electric compressor bypass valve and reduces current flow to the electric compressor such that the vanes of the electric compressor do not rotate. In this way, electric energy may be conserved. Opening the electric compressor bypass valve allows air to flow around the electric compressor and into the engine so that the air may be used to adjust engine compression braking. Method 500 proceeds to 564.

At 564, the engine throttle is closed. A small amount of air may flow through the throttle even though the throttle is closed to a closed position where a throttle stop may prevent total closure of the throttle. The small amount of air may be used during engine compression braking to increase engine compression braking torque. Method 500 proceeds to exit.

The engine intake valves, exhaust valves, compressor bypass valve, electric compressor, and throttle are adjusted as described in steps 560-564 to provide small amounts of equalized engine compression braking and expansion braking. The small amounts of equalized compression braking and expansion braking may reduce engine noise and vibration while still generating engine braking to reduce or maintain vehicle speed.

At 508, method 500 judges if the requested amount of engine braking torque is less than a second threshold engine braking torque and greater than (G.T.) the first threshold engine braking torque. In one example, the second threshold engine braking torque may be an engine braking torque where the requested engine braking torque is greater than an amount of engine braking than may be provided without increasing the engine compression torque and maintaining a threshold level of engine expansion braking torque. The second threshold engine braking torque may be empirically determined via operating the engine on a dynamometer and measuring expansion and compression braking torques while intake and exhaust valve timing is adjusted. If method 500 judges that the requested amount of engine braking torque is less than the second threshold engine braking torque and greater than the first threshold engine braking torque, then the answer is yes and method 500 proceeds to 570. Otherwise, the answer is no and method 500 proceeds to 510.

At 570, method 500 adjusts intake and exhaust valve timing of engine cylinders to maintain engine expansion braking torque at a threshold level and increase compression braking torque responsive to the requested engine braking torque. In one example, the intake valves and exhaust valves of the cylinder continue to operate by opening and closing twice during an engine cycle. The intake valves may be opened a first time during an engine cycle at or near BDC (e.g., within 10 crankshaft degrees of BDC in the compression stroke) of a compression stroke of the cylinder and the intake valves may be closed a first time during the engine cycle during a first quarter of the compression stroke of the cylinder during the engine cycle. The intake valves may be opened a second time at or near BDC (e.g., within 10 crankshaft degrees of BDC in the exhaust stroke) of an exhaust stroke of the cylinder and the intake valves may be closed a second time during a first quarter of the exhaust stroke during the engine cycle. This intake valve timing may provide a maximum amount of expansion braking during the engine cycle.

Similarly, the exhaust valves may be opened and closed two times for every engine cycle. The exhaust valves may be opened a first time during the engine cycle during a last quarter of the compression stroke of the cylinder during the engine cycle. The exhaust valves may be closed a first time at or near TDC (e.g., within 10 crankshaft degrees of TDC in the compression stroke) of the compression stroke of the cylinder. The exhaust valves of the cylinder may be opened a second time during the engine cycle during a last quarter of the exhaust stroke of the cylinder. The exhaust valves may be closed the second time during the engine cycle at or near TDC (e.g., within 10 crankshaft degrees of TDC in the exhaust stroke) of the exhaust stroke of the cylinder. Examples of such intake and exhaust valve timings are shown in FIG. 6B. The intake and exhaust opening and closing timings may be empirically determined and stored in controller memory in a table or function. The table or function may be referenced via engine speed and the requested engine braking amount.

At 572, method 500 opens the electric compressor bypass valve and reduces current flow to the electric compressor such that the vanes of the electric compressor do not rotate. In this way, electric energy may be conserved. Opening the electric compressor bypass valve allows air to flow around the electric compressor and into the engine so that the air may be used to adjust engine compression braking. Method 500 proceeds to 574.

At 574, the engine throttle is opened responsive to the requested amount of engine braking torque. In one example, the throttle opening amount may be made proportionate to the requested amount of engine braking torque. Method 500 proceeds to exit.

The engine intake valves, exhaust valves, compressor bypass valve, electric compressor, and throttle are adjusted as described in steps 570-574 to provide increased amounts of engine braking torque where the engine compression braking torque may be increased while the expansion braking torque is maintained at a threshold level. The increases in engine braking torque may be provided via opening the throttle to increase the amount of air trapped in engine cylinders during compression and exhaust strokes of the cylinders.

At 510, method 500 judges if the requested amount of engine braking torque is less than a third threshold engine braking torque and greater than (G.T.) the second threshold engine braking torque. In one example, the third threshold engine braking torque may be an engine braking torque where the requested engine braking torque is greater than an amount of engine braking torque that may be provided without decreasing engine expansion braking torque. The third threshold engine braking torque may be empirically determined via operating the engine on a dynamometer and measuring expansion and compression braking torques while intake and exhaust valve timing is adjusted. If method 500 judges that the requested amount of engine braking torque is less than the third threshold engine braking torque and greater than the second threshold engine braking torque, then the answer is yes and method 500 proceeds to 580. Otherwise, the answer is no and method 500 proceeds to 512.

Figure 6C:
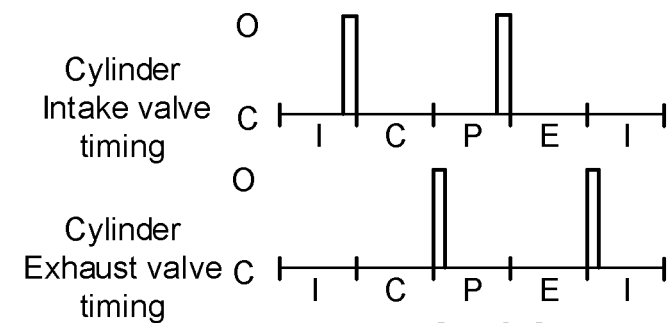

At 580, method 500 adjusts intake and exhaust valve timing of engine cylinders to decrease engine expansion braking torque and increase compression braking torque responsive to the requested engine braking torque. By decreasing the expansion braking by opening the intake valve during the intake and power strokes instead of during the compression stroke and exhaust stroke, the amount of compression braking may be increased by an amount that exceeds the reduction in the amount of expansion braking. Thus, the net engine braking torque may be increased. The intake valves and exhaust valves of the cylinder continue to operate by opening and closing twice during an engine cycle. The first intake valve opening and closing times of the cylinder during a cycle of the cylinder may be advanced into the intake stroke of the cylinder (e.g., during a last quarter of the intake stroke) and the second intake valve opening and closing times of the cylinder may be advanced into the power stroke of the cylinder (e.g., during a last quarter of the power stroke). Further, the first exhaust valve opening and closing times of the cylinder during the engine cycle may be retarded into the power stroke of the cylinder during the engine cycle to increase the amount of air trapped in the cylinder during the compression stroke of the cylinder. The second exhaust valve opening and closing times of the cylinder during the engine cycle may be retarded into the intake stroke of the cylinder one to increase the amount of air trapped in the cylinder during the exhaust stroke of the cylinder. Examples of such intake and exhaust valve timing are shown in FIG. 6C. The intake and exhaust opening and closing timings may be empirically determined and stored in controller memory in a table or function. The table or function may be referenced via engine speed and the requested engine braking amount.

At 582, method 500 opens the electric compressor bypass valve and reduces current flow to the electric compressor such that the vanes of the electric compressor do not rotate. In this way, electric energy may be conserved. Opening the electric compressor bypass valve allows air to flow around the electric compressor and into the engine so that the air may be used to adjust engine compression braking. Method 500 proceeds to 584.

At 584, the engine throttle is opened responsive to the requested amount of engine braking torque. In one example, the throttle opening amount may be made proportionate to the requested amount of engine braking torque. Method 500 proceeds to exit.

The engine intake valves, exhaust valves, compressor bypass valve, electric compressor, and throttle are adjusted as described in steps 580-584 to provide increased amounts of engine braking torque where the engine compression braking torque may be increased while the expansion braking torque is reduced to provide a net engine braking torque increase. The increases in engine braking torque may be provided via opening the throttle to increase the amount of air trapped in engine cylinders during compression and exhaust strokes of the cylinders.

At 512, method 500 adjusts intake and exhaust valve timings to maximize engine compression braking and expansion braking. In one example, the intake and exhaust valves may be opened and closed twice during an engine cycle as is previously described. The intake and exhaust opening and closing timings may be empirically determined and stored in controller memory in a table or function. The table or function may be referenced via engine speed and the requested engine braking amount. The intake and exhaust valve timings may be adjusted such that significantly larger engine compression braking is provided than engine expansion braking. The intake and exhaust valve timings to maximize engine compression braking and expansion braking may be empirically determined via operating the engine on a dynamometer and adjusting intake and exhaust valve opening times. Method 500 proceeds to 514.

At 514, method 500 fully opens the engine throttle. The engine throttle is fully opened to reduce the possibility of vacuum accumulating within the engine intake manifold, which may reduce engine braking torque. Method 500 proceeds to 516.

At 516, method 500 closes the electric compressor bypass valve. The electric compressor bypass valve is closed to increase the efficiency of the electric compressor. Method 500 proceeds to 518.

At 518, method 500 adjusts an amount of electrical current supplied to the electric compressor responsive to the requested engine braking torque. Thus, the amount of current supplied to the electric compressor increases as the amount of requested engine braking torque increases. Further, the amount of current supplied to the electric compressor decreases as the amount of requested engine braking torque decreases. The vanes of the electric compressor rotate and compress air entering the engine so that a larger amount of air may be trapped in engine cylinders, thereby increasing engine compression braking. Speed of the electric compressor is adjusted to meet the amount of requested engine braking torque. Method 500 proceeds to exit.

In this way, intake and exhaust valve timing may be adjusted in cooperation with adjusting engine throttle position and electric compressor current to meet amounts of requested engine braking torque. In addition, the electric compressor may be deactivated or supplied with very little electrical current until a threshold amount of requested engine braking torque is requested.

Thus, the method of FIG. 5 may provide for an engine control method, comprising: adjusting intake and exhaust poppet valve timing via a controller to equalize engine braking torque generated via compression braking and engine braking torque generated via expansion braking in response to a requested braking torque that is less than a first threshold torque. The method includes where adjusting intake poppet valve timing includes opening an intake poppet valve of a cylinder during a last quarter of an intake stroke of a cylinder cycle of the cylinder and closing the intake valve of the cylinder during a first quarter of a compression stroke of the cylinder cycle of the cylinder. The method includes where adjusting intake poppet valve timing also includes opening the intake poppet valve of the cylinder during a last quarter of a power stroke of the cylinder cycle of the cylinder and closing the intake valve of the cylinder during a first quarter of an exhaust stroke of the cylinder cycle of the cylinder.

In some examples, the method includes where adjusting exhaust poppet valve timing includes opening an exhaust poppet valve of the cylinder during a last quarter of the compression stroke of the cylinder cycle of the cylinder and closing the exhaust valve of the cylinder during a first quarter of the power stroke of the cylinder cycle of the cylinder. The method includes where adjusting exhaust poppet valve timing includes opening the exhaust poppet valve of the cylinder during a last quarter of the exhaust stroke of the cylinder cycle of the cylinder and closing the exhaust valve of the cylinder during a first quarter of an intake stroke of a second cylinder cycle that immediately follows the cylinder cycle of the cylinder. The method further comprises additionally adjusting the intake and exhaust poppet valve timing to increase and decrease engine braking in response to the requested engine braking torque. The method further comprises opening a compressor bypass valve in response to the requested engine braking torque.

The method of FIG. 5 also provides for an engine control method, comprising: adjusting intake and exhaust poppet valve timing via a controller to equalize engine braking torque generated via compression braking and engine braking torque generated via expansion braking in response to a requested braking torque being less than a first threshold torque; and increasing engine compression braking and decreasing engine expansion braking in response to the requested braking torque being greater than the first threshold torque. The method includes where increasing engine compression braking includes opening an intake poppet valve of a cylinder during a last quarter of an intake stroke of a cylinder cycle of the cylinder and closing the intake valve of the cylinder at or before bottom dead center of the intake stroke of the cylinder cycle of the cylinder. The method includes where increasing engine compression braking includes opening the intake poppet valve of the cylinder during a last quarter of a power stroke of the cylinder cycle of the cylinder and closing the intake valve of the cylinder at or before bottom dead center of the power stroke of the cylinder cycle of the cylinder.

In some examples, the method includes where increasing engine compression braking includes opening an exhaust poppet valve of the cylinder at top dead center of the intake stroke of the cylinder cycle of the cylinder and closing the exhaust valve of the cylinder during the first quarter of the intake stroke of the cylinder cycle of the cylinder. The method includes where increasing engine compression braking includes opening the exhaust poppet valve of the cylinder at top dead center power stroke of the cylinder cycle of the cylinder and closing the exhaust valve of the cylinder during a first quarter of the power stroke of the cylinder cycle of the cylinder. The method further comprises adjusting a position of a throttle responsive to the requested braking torque. The method further comprises opening a compressor bypass valve responsive to the requested braking torque increasing.

Referring now to FIG. 6A, example intake and exhaust valve timing for a cylinder during an engine cycle is shown. In this example, the description of FIGS. 6A-6C follow a convention where an engine cycle duration is 720 crankshaft degrees during which each cylinder under goes four strokes whether the engine is operating with two or four stroke valve timing. Likewise, a cylinder cycle is four strokes and 720 crankshaft degrees whether the engine is operating with two or four stroke valve timing. Further, cylinder strokes are identified based on four stroke cylinder operation (e.g., I—intake, C—compression, P—power or expansion, and E—exhaust) irrespective of intake and exhaust valve operation. The valve timings shown in FIG. 6A are for conditions when a desired engine braking torque is less that a first threshold engine braking torque.

The first plot from the top of FIG. 6A is a plot that shows intake valve timing during an engine cycle. The intake valves are open when the trace is visible and the intake valves are closed when the trace is not visible. The intake valves are fully open when the trace is at the level indicated by "O." The intake valves are fully closed when the trace is at the level indicated by "C."

The second plot from the top of FIG. 6A is a plot that shows exhaust valve timing during the engine cycle. The exhaust valves are open when the trace is visible and the exhaust valves are closed when the trace is not visible. The exhaust valves are fully open when the trace is at the level indicated by "O." The exhaust valves are fully closed when the trace is at the level indicated by "C."

The intake valves are opened a first time during an engine cycle during a last quarter (e.g., 45 crankshaft degrees) of an intake stroke during the cycle of the engine and the intake valves are closed a first time during the engine cycle during a first quarter of a compression stroke of the cylinder that immediately follows the intake stroke during the engine cycle. The intake valves are opened a second time in the engine cycle during a last quarter of a power stroke of the cylinder, and the intake valves are closed a second time during the engine cycle during a first quarter of an exhaust stroke that immediately follows the power stroke during the engine cycle.

Similarly, the exhaust valves are opened and closed two times for every engine cycle. The exhaust valves are opened a first time during the engine cycle during a last quarter of a compression stroke of the cylinder and the exhaust valves are closed a first time during a first quarter of a power stroke of the cylinder that immediately follows the compression stroke during the engine cycle. The exhaust valves of the cylinder are opened a second time during the engine cycle during a last quarter of an exhaust stroke of the cylinder, and the exhaust valves are closed the second time during the engine cycle during a first quarter of an intake stroke of the cylinder that immediately follows the exhaust stroke of the cylinder.

Referring now to FIG. 6B, example intake and exhaust valve timing for a cylinder during an engine cycle is shown. In this example, the valve timings shown in FIG. 6B are for conditions when a desired engine braking torque is greater than a first threshold engine braking torque and less than a second threshold requested engine braking torque.

The first plot from the top of FIG. 6B is a plot that shows intake valve timing during an engine cycle. The intake valves are open when the trace is visible and the intake valves are closed when the trace is not visible. The intake valves are fully open when the trace is at the level indicated by "O." The intake valves are fully closed when the trace is at the level indicated by "C."

The second plot from the top of FIG. 6B is a plot that shows exhaust valve timing during the engine cycle. The exhaust valves are open when the trace is visible and the exhaust valves are closed when the trace is not visible. The exhaust valves are fully open when the trace is at the level indicated by "O." The exhaust valves are fully closed when the trace is at the level indicated by "C."

The intake valves are shown being opened a first time during an engine cycle at or near BDC (e.g., within 10 crankshaft degrees of BDC in the compression stroke) of a compression stroke of the cylinder and the intake valves are shown being closed a first time during the engine cycle during a first quarter of the compression stroke of the cylinder during the engine cycle. The intake valves are shown being opened a second time at or near BDC (e.g., within 10 crankshaft degrees of BDC in the exhaust stroke) of an exhaust stroke of the cylinder and the intake valves are shown being closed a second time during a first quarter of the exhaust stroke during the engine cycle. This intake valve timing may provide a maximum amount of expansion braking during the engine cycle.

Similarly, the exhaust valves are shown being opened and closed two times for every engine cycle. The exhaust valves are shown being opened a first time during the engine cycle during a last quarter of the compression stroke of the cylinder during the engine cycle. The exhaust valves are shown being closed a first time at or near TDC (e.g., within 10 crankshaft degrees of TDC in the compression stroke) of the compression stroke of the cylinder. The exhaust valves of the cylinder are shown being opened a second time during the engine cycle during a last quarter of the exhaust stroke of the cylinder. The exhaust valves are shown being closed the second time during the engine cycle at or near TDC (e.g., within 10 crankshaft degrees of TDC in the exhaust stroke) of the exhaust stroke of the cylinder.

Referring now to FIG. 6C, example intake and exhaust valve timing for a cylinder during an engine cycle is shown. In this example, the valve timings shown in FIG. 6C are for conditions when a desired engine braking torque is greater than a second threshold engine braking torque and less than a third threshold requested engine braking torque.

The first plot from the top of FIG. 6C is a plot that shows intake valve timing during an engine cycle. The intake valves are open when the trace is visible and the intake valves are closed when the trace is not visible. The intake valves are fully open when the trace is at the level indicated by "O." The intake valves are fully closed when the trace is at the level indicated by "C."

The second plot from the top of FIG. 6C is a plot that shows exhaust valve timing during the engine cycle. The exhaust valves are open when the trace is visible and the exhaust valves are closed when the trace is not visible. The exhaust valves are fully open when the trace is at the level indicated by "O." The exhaust valves are fully closed when the trace is at the level indicated by "C."

The intake valves are shown being opened a first time during an engine cycle during a last quarter of an intake stroke, and the intake valves are shown being closed a first time near BDC (e.g., within 10 crankshaft degrees of BDC in the intake stroke) of the intake stroke of the cylinder during the engine cycle. The intake valves are shown being opened a second time during an engine cycle during a last quarter of a power stroke, and the intake valves are shown being closed a second time near BDC (e.g., within 10 crankshaft degrees of BDC in the power stroke) of the power stroke of the cylinder during the engine cycle.

Similarly, the exhaust valves are shown being opened and closed two times for every engine cycle. The exhaust valves are shown being opened a first time near TDC (e.g., within 10 crankshaft degrees of TDC in the power stroke) power stroke during the engine cycle. The exhaust valves are shown being closed a first time during a first quarter of the power stroke of the cylinder. The exhaust valves of the cylinder are shown being opened a second time near TDC (e.g., within 10 crankshaft degrees of TDC in the intake stroke) intake stroke during the engine cycle. The exhaust valves are shown being closed a second time during a first quarter of the intake stroke of the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine control method, comprising:
adjusting intake and exhaust poppet valve timing via a controller to equalize engine braking torque generated via compression braking and engine braking torque generated via expansion braking in response to a requested braking torque that is less than a first threshold torque, where adjusting intake poppet valve timing includes fully opening an intake poppet valve of a cylinder during a last quarter of an intake stroke of a cylinder cycle of the cylinder and fully closing the intake valve of the cylinder during a first quarter of a compression stroke of the cylinder cycle of the cylinder.

2. The method of claim 1, where adjusting intake poppet valve timing also includes fully opening the intake poppet valve of the cylinder during a last quarter of a power stroke of the cylinder cycle of the cylinder and fully closing the intake valve of the cylinder during a first quarter of an exhaust stroke of the cylinder cycle of the cylinder.

3. The method of claim 2, where adjusting the exhaust poppet valve timing includes fully opening an exhaust poppet valve of the cylinder during a last quarter of the compression stroke of the cylinder cycle of the cylinder and fully closing the exhaust valve of the cylinder during a first quarter of the power stroke of the cylinder cycle of the cylinder.

4. The method of claim 3, where adjusting the exhaust poppet valve timing includes fully opening the exhaust poppet valve of the cylinder during a last quarter of the exhaust stroke of the cylinder cycle of the cylinder and fully closing the exhaust valve of the cylinder during a first quarter of an intake stroke of a second cylinder cycle that immediately follows the cylinder cycle of the cylinder.

5. The method of claim 4, further comprising additionally adjusting the intake and exhaust poppet valve timing to increase and decrease engine braking in response to the requested engine braking torque.

6. The method of claim 1, further comprising opening a compressor bypass valve in response to the requested engine braking torque.

7. An engine control method, comprising:
adjusting intake and exhaust poppet valve timing via a controller to equalize engine braking torque generated via compression braking and engine braking torque generated via expansion braking in response to a requested braking torque being less than a first threshold torque; and
increasing engine compression braking and decreasing engine expansion braking in response to the requested braking torque being greater than the first threshold torque.

8. The method of claim 7, where increasing engine compression braking includes fully opening an intake poppet valve of a cylinder during a last quarter of an intake stroke of a cylinder cycle of the cylinder and fully closing the intake valve of the cylinder at or before bottom dead center of the intake stroke of the cylinder cycle of the cylinder.

9. The method of claim 8, where increasing engine compression braking includes fully opening the intake poppet valve of the cylinder during a last quarter of a power stroke of the cylinder cycle of the cylinder and fully closing the intake valve of the cylinder at or before bottom dead center of the power stroke of the cylinder cycle of the cylinder.

10. The method of claim 9, where increasing engine compression braking includes fully opening an exhaust poppet valve of the cylinder at top dead center of the intake stroke of the cylinder cycle of the cylinder and fully closing the exhaust poppet valve of the cylinder during the first quarter of the intake stroke of the cylinder cycle of the cylinder.

11. The method of claim 10, where increasing engine compression braking includes fully opening the exhaust poppet valve of the cylinder at top dead center of the power stroke of the cylinder cycle of the cylinder and fully closing the exhaust valve of the cylinder during a first quarter of the power stroke of the cylinder cycle of the cylinder.

12. The method of claim 7, further comprising adjusting a position of a throttle responsive to the requested braking torque.

13. The method of claim 7, further comprising opening a compressor bypass valve responsive to the requested braking torque increasing.

* * * * *